United States Patent [19]

Bauer et al.

[11] Patent Number: 4,692,677
[45] Date of Patent: Sep. 8, 1987

[54] WINDSHIELD WIPER SYSTEM

[75] Inventors: Kurt Bauer, Ingersheim; Theodor Schneider, Freudental, both of Fed. Rep. of Germany

[73] Assignee: SWF Electric GmbH, Bietigheim-Bissingen, Fed. Rep. of Germany

[21] Appl. No.: 809,934

[22] Filed: Dec. 16, 1985

[30] Foreign Application Priority Data

Dec. 21, 1984 [DE] Fed. Rep. of Germany ....... 3446761

[51] Int. Cl.$^4$ .............................................. B60S 1/08
[52] U.S. Cl. .............................. 318/443; 318/DIG. 2; 15/250.17
[58] Field of Search ......... 318/443, 444, 445, DIG. 2; 15/250 C, 250.02, 250.04, 250.13, 250.16, 250.17; 307/9, 10 R

[56] References Cited

U.S. PATENT DOCUMENTS

| | | | |
|---|---|---|---|
| 3,675,103 | 7/1972 | Elliott | 15/250.13 |
| 4,271,381 | 6/1981 | Munz et al. | 318/444 X |
| 4,276,501 | 6/1981 | Fanz | 15/250.17 X |
| 4,309,646 | 1/1982 | Liedtke et al. | 318/443 |

Primary Examiner—William M. Shoop, Jr.
Assistant Examiner—Bentsu Ro
Attorney, Agent, or Firm—James B. Raden; Donald J. Lenkszus

[57] ABSTRACT

A windshield wiper system for motor vehicles includes an electric motor which drives at least one wiper during normal wiper operation, too and fro between two reversing positions within a wiping area. When the wiper system has been switched off by means of an operating switch, the wiper is moved to a concealed parking position outside the wiping area. Upon switching on of the wiper system and during normal operation the motor runs in one direction of rotation, but for moving the wipers into the parking position the motor runs in the other direction of rotation. A position switch is changed over by a switching member coupled with a rotating drive member of the electric motor. The position switch, after the operating switch has been switched off, releases a signal for reversing the polarity and in the parking position releases a signal for switching off the electric motor. So that the wiping cycle for entering the parking position begins in the first reversing position adjacent to the parking position and the wiper occupies the first reversing position in the dwell time interval of intermittent operation, the position switch is changed over independently of the direction of rotation of the electric motor and always in the same position of the drive member.

15 Claims, 7 Drawing Figures

WINDSHIELD WIPER SYSTEM

BACKGROUND OF THE INVENTION

The invention pertains to a windshield wiper system.

Wiper systems for motor vehicles are known in which the wiper moves to and fro between two reversing position within a wiping area during normal wiper operation and is deposited in a so-called concealed parking position outside the wiping area when the wiper system has been switched off by means of an operating switch. Thereby the electric motor runs in one direction of rotation upon switching on of the wiper system and during normal continuous and intermittent wiper operation. If the operating switch is then switched off, a signal is derived from the changeover of the position switch during return run for reversing the polarity of the electric motor. In the following wiping cycle with changed direction of rotation of the electric motor an eccentric in the crank mechanism between electric motor and wiper is changed such that the wiping angle is increased and thus the wiper enters the concealed parking position outside the driver's view. The position switch is changed over and the electric motor is stopped thereby. Thus the wiper is deposited in the concealed parking position.

During intermittent wiper operation the motor rotates in the same direction it does during continuous wiper operation. During the time interval between two wiping cycles the wiper is not brought into the concealed parking position nor in the reversing position adjacent to the parking position, but extends far into the wiping area. Furthermore it has been noticed that at the end of continuous wiper operation the polarity of the electric motor is not reversed in the reversing position adjacent to the parking position, but in most cases within the normal wiping area.

Therefore, the reversing position adjacent the parking position is not reached during intermittent operation, nor is it reached in the last wiping cycle of continuous operation run through in the normal direction of rotation. In both cases the motor vehicle window pane is insufficiently cleaned. Furthermore the view for the vehicle passengers is restricted especially during intermittent operation in which the wiper rests in the normal wiping area during the time intervals between wipes.

SUMMARY OF THE INVENTION

One object of the invention is to provide a windshield wiper system which operates in such a way that with each wiping cycle the entire wiping area between the two reversing positions of normal continuous wiper operation is wiped.

In a wiper system according to the invention the position switch is always changed over in the same position of the drive member independently of the direction of rotation of the electric motor.

In accordance with the invention, the switching member and the drive member are coupled with each other via a dead travel. The dead travel extends over an angle which makes the difference between the two positions in which the position switch would be operated in case of a solid coupling between switching member and drive member.

BRIEF DESCRIPTION OF THE DRAWING

The invention will be better understood from a reading of the following detailed description in conjunction with the drawing in which.

DETAILED DESCRIPTION

Figure 1:
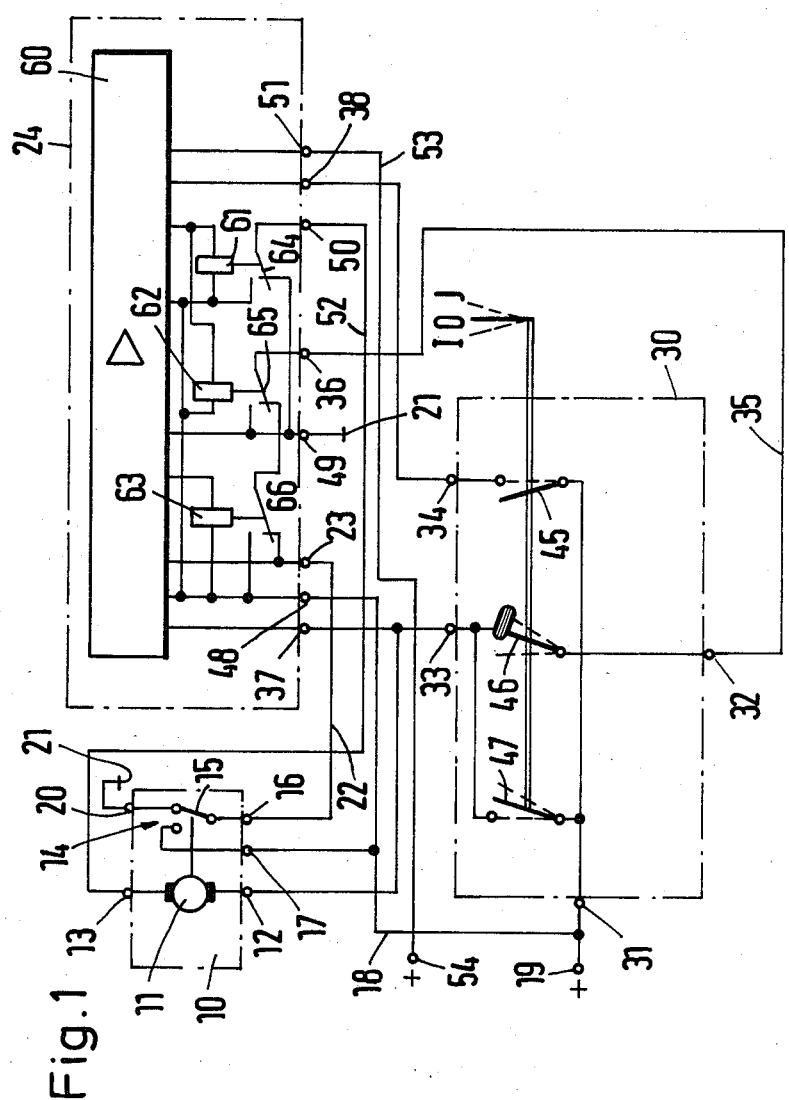
FIG. 1 is a schematic circuit arrangement of a windshield wiper system according to the invention.

In the drawing the structural unit of an electric motor 11 with permanent magnets is designated 10. Motor 11 drives at least one wiper (which is not shown). Voltage is supplied to motor 11 via the terminals 12 and 13 and a position switch 14 is formed as a two-way switch. Movable contact 15 of the position switch 14 is continuously connected to terminal 16 and to battery via terminal 17 and ignition switch terminal 19 or to ground via terminal 21. Terminal 16 is connected to a terminal 23 of a control device 24 via lead 22.

Manually operable operating switch 30 can occupy three different switching positions. The operating switch 30 has a total of four terminals 31, 32, 33 and 34. Terminal 31 is connected with the ignition switch terminal 19. Terminal 32 is connected via lead 35 to terminal 36 of control device 24. Terminal 33 of the operating switch 30 is connected with terminal 12 of the electric motor 11 and with one input 37 of the control device 24. Terminal 34 of the operating switch 30 is connected to terminal 38 of control device 24.

Operating switch 30 has three bridging contacts 45, 46 and 47 which are movable from a central zero position into a continuous operation position or in an intermittent operation position. In the zero position and in the intermittent operation position the bridging contact 46 interconnects the two connections 32 and 33. In the continuous operation position, battery potential is conducted to terminal 33 via the bridging contact 47 from terminal 31. In the intermittent operation position battery potential is conducted to terminal 34 from terminal 31 by bridging contact 45.

In addition to terminals 23, 36, 37 and 38 the control device 24 has four further terminals 48, 49, 50 and 51. Terminal 48 is connected with the output 19 of the ignition switch via lead 18, terminal 49 is connected to ground 21. Terminal 50 is connected to terminal 13 of the electric motor via lead 52. Terminal 51 is directly connected to battery via a lead 53.

In addition to an electronic module 60 the control device 24 comprises three relays 61, 62 and 63 whose coils are each connected between terminal 48 and the module 60. The relays each include a movable contact 64, 65 or 66. Contact 66 changes between the terminals 23 and 48 of the control device 24. Contact 65 changes between a connection with the contact 66 of the relay 63 and terminal 49 and is continuously connected with the terminal 36. Contact 64 of the relay 61 changes between the terminal 48 and terminal 49. The two relays 61 and 62 with their contacts 64 and 65 form a polarity reversing switch. The relay 63 is the so-called interval relay.

The mode of operation of the circuit arrangement shown in FIG. 1 is described below. It is assumed that the wiper driven by the electric motor 11 occupies the concealed parking position and the various switches occupy the switching positions shown in the drawing. The electric motor 11 is then short-circuited, because terminal 13 is connected to ground via lead 52, the terminal 50, contact 64 and terminal 49 of the control device 24 and also terminal 12 of the electric motor 11 via, terminal 33, bridging contact 46 and terminal 32 of the operating switch 30, lead 35, terminal 36 of control device 24, contact 65, contact 66, terminal 23, lead 22, terminal 16, movable contact 15 of position switch 14 and the terminal 20. All relays are de-energized.

If the operating switch 30 is moved to the continuous operation position, the motor short circuit is at first interrupted via bridging contact 46. Positive potential is conducted to the connection 12 of the motor and to the terminal 37 of the control device 24 via the bridging contact 47, which is connected to terminal 19 of the ignition switch. Positive potential on the terminal 37 means that independently of the switching position of the position switch 14 at first none of the relays of the control device can be energized. Thus the connection 13 of the motor remains connected to ground. Thus the electric motor runs in a predetermined direction of rotation, for example counter clockwise, and moves the wipers or the wiper between the reversing position adjacent to the parking position and a second reversing position across the window pane of a motor vehicle. As will be illustrated in detail by way of the further Figures, the movable contact of the position switch 14 shortly after leaving the parking position changes from the terminal 20 to terminal 17 of the structural unit 10 and is always only for a short time changed over to the terminal 20 in the first reversing position of the wiper.

To switch the wiper system off, the operating switch 30 is again brought into the position shown. Terminal 12 of the electric motor 11 is still connected to battery potential via the bridging contact 46 of the operating switch 30, control device 24 and the position switch 14, because, during normal wiper operation the movable contact 15 of the position switch 14 is applied to battery potential via the terminal 17 as long as the wiper does not occupy its reversing position adjacent to the parking position. If the wiper now reaches its first reversing position adjacent to the parking position, the movable contact 15 of the position switch 14 and the contact 23 of the control device 24 are changed to ground potential. Thereby a short circuit across the motor is initially closed via the bridging contact 46 of the operating switch 30. In addition the two relays 61 and 62 are energized. This does not change the potential at terminal 12 of the motor 11. The switching of contact 65 of the relay 62 is however necessary to keep terminal 12 at ground potential when contact 15 of the parking position switch 14 is again connected to battery potential after leaving the first reversing position. Terminal 13 of the electric motor 11 is connected with terminal 19 of the ignition switch via contact 64 of relay 61. Thus the polarity of the motor 11 is reversed and it changes its direction of rotation starting from the first reversing position of the wiper. Thus the motor runs in this other direction of rotation until the wiper reaches the concealed parking position and contact 15 of the position switch 14 changes again fron terminal 17 to terminal 20. Ground potential is conducted into the control device 24 via the terminal 23. Both relays 61 and 62 of the control device 24 drop out and short-circuit the motor 11.

If the operating switch 30 is moved to the intermittent operation position, terminal 13 of the electric motor 11 continues to be connected to ground via the contact 64 of the relay 61. The relay 63 becomes energized, so that terminal 12 of the electric motor 11 is connected with terminal 19 of the ignition switch via bridging contact 46 of operating switch 30, contact 65 of relay 62 and contact 66 of the relay 63. Thus the motor starts in counter clockwise direction. After one wiping cycle contact 15 of the position switch 14 reaches the first reversing position again and is switched to terminal 20 from terminal 17. Relay 63 therefore drops out for a predetermined time interval, the time interval of the intermittent wiper operation, and short-circuits motor 11. After the time interval the relay is again energized and drops out again in the first reversing position after one wiping cycle. If the operating switch is again brought into the position shown to switch off the intermittent operation, the polarity of the motor 11 is reversed in the first reversing position and then, during the wiping cycle, the motor rotates in the other direction and deposits the wiper into the concealed parking position.

The windshield wiper system includes a rotating drive member which always occupies the same position in the parking position and in the first reversing position of the wiper. It is important that position switch 14 always changes over at the same position of the drive member independently of the direction of rotation of the electric motor so that the motor is always reversed in the first reversing position and the wiper is deposited in the first reversing position during the time interval of intermittent operation. How this can be ensured is illustrated in detail in FIGS. 2 to 7.

A cup-shaped gear housing 70 is directly connected to the electric motor 11. Housing 70 is closed by a cover 71 and has a bearing eye 72 in its bottom. A crank shaft 74 is rotatably mounted in bearing eye 72 via bearing bushings 73. Within gear housing 70, the worm wheel 75 is mounted on the crank shaft 74 in a manner protected against twisting. The worm wheel is driven by the worm shaft of the motor 11 and forms the rotating drive member. On the axially elongated hub 76 of the worm wheel 75 a switching member 77 is rotatably mounted relative to the worm wheel 75. The switching member is a cam with a ring 78 supported on the hub 76 of the worm wheel 75, a stud 79 projecting radially and a driving pin 80 which axially engages in a groove 81 of the worm wheel 75. The groove extends over a predetermined angular segment. The groove 81 is much longer than the diameter of the pin 80, so that, in the other direction of rotation, the worm wheel 75 and the cam 77 are coupled with each other with a dead travel.

A vertical interruptor contact 85 extends in the gear housing 70 tangentially to cam 77. Vertical interruptor contact 85 has one end secured to the terminal 16 insulatedly secured to the cover 71. The other end of vertical interruptor contact 85 is positioned between the two terminals 17 and 20 which are also insulatedly secured in the cover 71 and is connectable with positive and negative poles of a power source. The vertical interruptor contact 85 is prestressed in such a way that it normally presses against the terminal 17.

Figure 3:
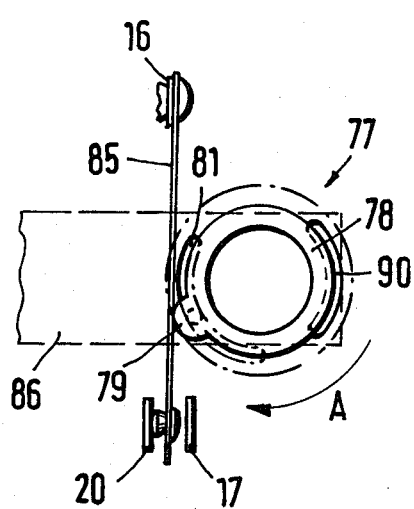
FIG. 3 is a view into a portion of the gear housing after the wiper motor has been stopped after rotating in one direction.
Figure 4:
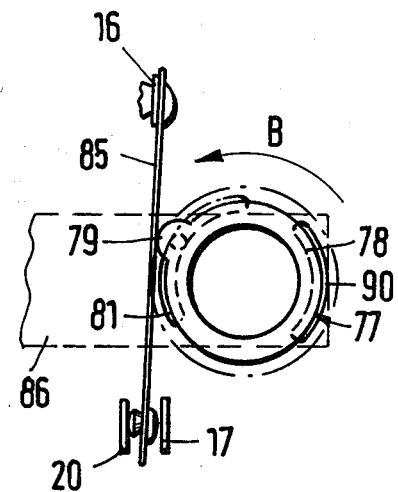
FIG. 4 is a view into a portion of the gear housing after the wiper motor has been stopped after rotating in the other direction of rotation.

FIG. 3 shows the position of cam 77 and of groove 81 of the worm wheel 75, when the motor is stopped after rotation in the direction of arrow A, i.e., in clockwise direction. This is so in the concealed parking position. FIG. 4 shows the corresponding parts when the motor is stopped after a rotation in counter-clockwise direction. This is so, for example, after each intermediate cycle during intermittent operation.

Starting from the representation in FIG. 3 it is assumed that the windshield wiper system is switched on for continuous operation. Then the worm wheel 75 rotates in the opposite direction of arrow A, i.e., in the direction of arrow B in FIG. 4. The frictional connection between the cam 77 and the worm wheel 75 is so strong that the cam 77 is immediately taken along by the worm wheel. It therefore moves away from the vertical interruptor contact 85, which changes from the terminal 20 to the terminal 17 immediately with the beginning of rotation. After a rotation of about 300 degrees the stud 79 of the cam 77 again meets the vertical interruptor contact 85. The latter is however prestressed against the terminal 17 and holds the stud 79 until the driving pin 80 has moved from one end to the other end of the groove 81 and is thereafter taken along by the worm wheel. Now the stud 79 presses the vertical interruptor contact 85 away from the terminal 17 to the terminal 20. This configuration is shown in FIG. 4. As long as the operating switch occupies its continuous operation position the change of the vertical interruptor contact 85 has no effect. If the operating switch were changed over to its zero position, the polarity of the electric motor would be reversed.

After the reversal of polarity the worm wheel rotates in the direction of arrow A. At first it carries cam 77 by means of a frictional connection, until the cam hits the vertical interruptor contact 85. The vertical interruptor contact holds the cam 77 until the driving pin 80 has again changed to the other end of the groove 81 and is carried along by the worm wheel 75. Stud 79 of the cam 77 then presses the vertical interruptor contact 85 away from the terminal 17 to the terminal 20. As can be seen by the position of the groove 81 and the crank 86 relative to the stationary terminals 16, 17 and 20, after the electric motor stops, the groove 81 and with it the worm wheel 75 and the crank 86 occupy the same angular position independently of the direction of rotation it had before. This is ensured in that, because of the dead travel between worm wheel 75 and cam 77, the vertical interruptor contact 85 always hits the terminal 20 at the same position of worm wheel 75. The position of the worm wheel 75 and of crank 86 then correspond to the first reversing position of the wiper. Accordingly, in the first reversing position the polarity of the motor is also reversed before it begins the last wiping cycle before entering the concealed parking position. During intermittent operation the wiper occupies the first reversing position in the time interval. In the concealed parking position the worm wheel 75 and the crank 86 occupy the same angular position as in the first reversing position.

Figure 2:
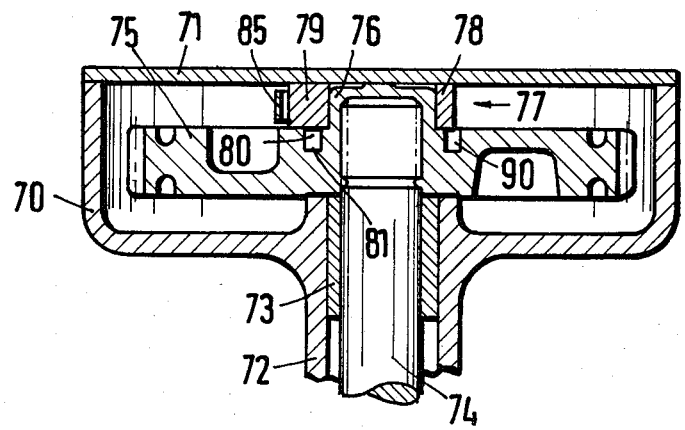
FIG. 2 is a section through the gear housing of the wiper motor.
Figure 5:
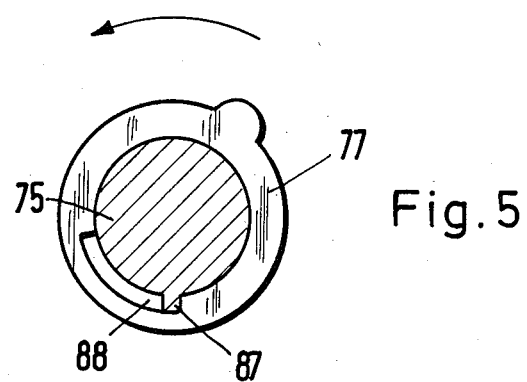
FIGS. 5 and 6 show a switching member and a drive member, which are coupled with each other by a radial projection.
Figure 6:
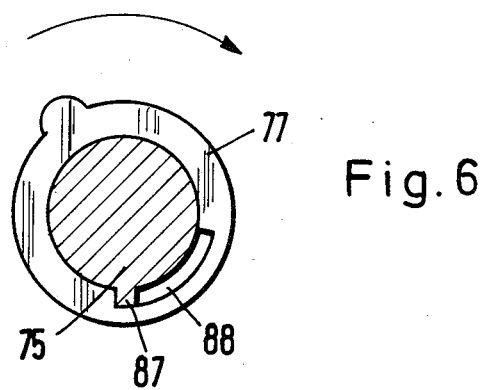

Whereas in the embodiment according to FIGS. 2 to 4 the worm wheel 75 and the cam 77 are coupled with each other in the axial direction, in the embodiment according to FIGS. 5 and 6 the coupling is effected in the radial direction. The worm wheel 75 has a radially projecting driving pin 87, which engages in a recess 88 of the cam extending over a given angular range. FIG. 5 shows the two parts at standstill after a rotation in counter clockwise direction, FIG. 6 after a rotation in clockwise direction. In both cases the worm wheel occupies the same position.

Figure 7:
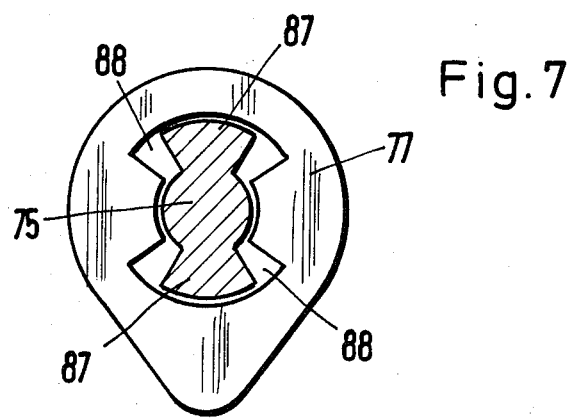
FIG. 7 illustrates another coupling between switching member and drive member.

By the embodiment according to FIG. 7 it is intended to emphasize that the cam 77 and the worm wheel 75 can also engage by means of two studs 87 and two recesses 88.

With regard to FIGS. 2 to 4 it is furthermore pointed out that the worm wheel 75 has in addition to the groove 81 a further groove 90, the length of which differs slightly from that of the groove 81. The position of the terminals 16, 17 and 20 and the form and the position of the vertical interruptor contact 85 have tolerances, so that the necessary dead travel between worm wheel 75 and switching member 77 will be different case by case. Now this groove can be selected for a coupling between worm wheel 75 and switching member 77 which makes possible a dead travel which is closest to the exactly necessary dead travel. Depending on which one of the grooves 81 or 90 has been chosen the relative position between the worm wheel 75 and the crank 86 has to be chosen.

The worm wheel can also be provided with more than two grooves.

What is claimed is:

1. A windshield wiper system, comprising:
   an operating switch;
   an electric motor having a shaft rotatable in a first direction and driving at least one wiper to and fro between two reversing positions within a wiping area when said operating switch is in at least a first position and rotatable in a second direction to drive said wiper to a concealed park position outside said wiping area when said operating switch is switched to an off position;
   a rotating drive member coupled to said shaft;
   a switching member coupled to said rotating drive member;
   a position switch for providing a signal for causing said motor to reverse directions from said first direction to said second direction after said operating switch is switched to said off position and for providing a signal to switch said motor off at said parking position, said position switch being coupled to said rotating drive member by said switching member, said position switch being operable whereby it always changes over at the same position of said drive member and independently of the direction of rotation of said shaft.

2. A windshield wiper system in accordance with claim 1, wherein:
   said switching member and said drive member are coupled with each other via a dead travel.

3. A windshield wiper system in accordance with claim 2, wherein:
   one of said switching member and drive member includes a recess and the other of said switching member and drive member includes a projection engaging said recess, said recess being larger than said projection.

4. A windshield wiper system in accordance with claim 3, wherein:
   said projection engages in said recess in the axial direction of said drive member.

5. A windshield wiper system in accordance with claim 3, wherein:

said projection engages in said recess radially to the axis of said drive member.

6. A windshield wiper system in accordance with claim 2, wherein:
said switching member comprises a ring shaped bearing portion; preferably a ring coaxially mounted on said drive member and rotatably mounted relative to the drive member within said dead travel.

7. A windshield wiper system in accordance with claim 6, wherein:
said switching member is directly mounted on said drive member.

8. A windshield wiper system in accordance with claim 1, wherein:
said drive member comprises a worm wheel of a worm gearing of said electric motor.

9. A windshield wiper system in accordance with claim 2, wherein:
when said electric motor starts movement of said wiper from said parking position, said switching member is carried along by said drive member because of a frictional connection so that said position switch is immediately reset and so that before said position switch is operated, said switching member is held until the end of the dead travel.

10. A windshield wiper system in accordance with claim 1, wherein:
said position switch comprises a vertical interruptor contact; and
said switching member comprises a cam.

11. A windshield wiper system in accordance with claim 10, wherein:
when the direction of rotation of said shaft is reversed, said cam is carried along by said drive member due to a frictional connection until it contacts and is held by said vertical interruptor contact.

12. A windshield wiper system in accordance with claim 1, comprising:
a gear assembly coupled to said electric motor;
said gear assembly having a housing; and
wherein said position switch comprises contacts disposed on the inside of said housing.

13. A windshield wiper system in accordance with claim 1, wherein:
said position switch is a two-way switch having a change-over contact which, in two switching positions is alternately connectable with the positive and negative poles of a power source and which in said parking position and in a reversing position adjacent to said parking position occupies its first switching position, but said change-over contact otherwise being in its second switching position.

14. A windshield wiper system in accordance with claim 3, comprising:
a gearing coupled to said motor;
said drive member comprising one wheel of said gearing;
said drive member and said switching member being coupleable in a plurality of relative positions to each other with different dead travels.

15. A windshield wiper system in accordance with claim 14, wherein:
said one of said switching member and drive member includes at least a second recess larger than said projection, said projection being placed in one of said recess and said second recess.

* * * * *